US012561969B2

(12) United States Patent
Jung et al.

(10) Patent No.: US 12,561,969 B2
(45) Date of Patent: Feb. 24, 2026

(54) OBJECT RE-IDENTIFICATION APPARATUS AND METHOD THEREOF

(71) Applicants: Hyundai Motor Company, Seoul (KR); Kia Corporation, Seoul (KR); UIF (University Industry Foundation), Yonsei University, Seoul (KR)

(72) Inventors: Hyeon Seok Jung, Suwon-si (KR); Kyung Hwan Cho, Anyang-si (KR); Moon Sub Jin, Yongin-si (KR); Kyu Sang Choi, Suwon-si (KR); Bum Sub Ham, Seoul (KR); Chan Ho Eom, Seoul (KR); Geon Lee, Seoul (KR)

(73) Assignees: Hyundai Motor Company, Seoul (KR); KIA Corporation, Seoul (KR); UIF (University Industry Foundation), Yonsei University, Seoul (KR)

( * ) Notice: Subject to any disclaimer, the term of this patent is extended or adjusted under 35 U.S.C. 154(b) by 389 days.

(21) Appl. No.: 18/134,352

(22) Filed: Apr. 13, 2023

(65) Prior Publication Data

US 2024/0071071 A1 Feb. 29, 2024

(30) Foreign Application Priority Data

Aug. 26, 2022 (KR) ........................ 10-2022-0107755

(51) Int. Cl.
*G06V 10/98* (2022.01)
*G06V 10/56* (2022.01)
(Continued)

(52) U.S. Cl.
CPC ............ *G06V 10/993* (2022.01); *G06V 10/56* (2022.01); *G06V 10/761* (2022.01);
(Continued)

(58) Field of Classification Search
CPC .. G06V 10/993; G06V 10/56; G06V 10/7715; G06V 10/761; G06V 10/95; G06V 10/776
See application file for complete search history.

(56) References Cited

U.S. PATENT DOCUMENTS 3,853,403 A 12/1974 Bentley
6,192,371 B1 * 2/2001 Schultz ................. G06F 16/289
345/646
(Continued)

FOREIGN PATENT DOCUMENTS

CN 106557756 A 4/2017
CN 108921107 A 11/2018
(Continued)

OTHER PUBLICATIONS

Lin et al., 2019, "Improving Person Re-Identification by Attribute and Identity Learning" (pp. 1-12). (Year: 2019).*
(Continued)

*Primary Examiner* — Manav Seth
(74) *Attorney, Agent, or Firm* — Slater Matsil, LLP

(57) ABSTRACT

In an embodiment an apparatus includes a processor configured to generate a feature extraction module using a dataset in which an attribute for each object is defined, receive an image obtained by a camera, extract an attribute of an object of interest from the image using the learned feature extraction module, identify an object re-identification candidate group based on the extracted attribute of the object of interest and re-identify the object of interest based on the identified object re-identification candidate group.

20 Claims, 11 Drawing Sheets

200

(51) Int. Cl.

| | |
|---|---|
| *G06V 10/74* | (2022.01) |
| *G06V 10/77* | (2022.01) |
| *G06V 10/776* | (2022.01) |
| *G06V 10/94* | (2022.01) |

(52) U.S. Cl.
CPC ........ *G06V 10/7715* (2022.01); *G06V 10/776* (2022.01); *G06V 10/95* (2022.01)

(56) References Cited

U.S. PATENT DOCUMENTS

| | | | | |
|---|---|---|---|---|
| 6,775,395 | B2 * | 8/2004 | Nishigaki | G06V 10/255 |
| | | | | 382/104 |
| 6,871,196 | B1 * | 3/2005 | Chan | G06Q 10/06 |
| | | | | 706/45 |
| 7,447,701 | B2 * | 11/2008 | Agarwal | G06F 16/289 |
| | | | | 707/999.102 |
| 9,396,412 | B2 * | 7/2016 | Kuo | G06F 18/214 |
| 9,449,258 | B1 * | 9/2016 | Palacio | G08G 1/04 |
| 9,852,340 | B2 * | 12/2017 | Mai | G06V 40/10 |
| 9,858,679 | B2 * | 1/2018 | Zhang | H04N 5/77 |
| 9,953,245 | B2 * | 4/2018 | Palacio | G08G 1/04 |
| 10,043,103 | B2 * | 8/2018 | Dodballapur | G06V 10/761 |
| 10,248,860 | B2 * | 4/2019 | Mai | G06V 10/24 |
| 10,282,616 | B2 * | 5/2019 | Gong | G06F 16/5838 |
| 10,607,484 | B2 * | 3/2020 | Yang | G06Q 50/26 |
| 10,915,662 | B2 * | 2/2021 | Gkoulalas-Divanis | |
| | | | | G06F 21/577 |
| 11,017,261 | B1 * | 5/2021 | Zheng | G06V 10/764 |
| 11,138,418 | B2 | 10/2021 | Zuckerman et al. | |
| 11,301,687 | B2 | 4/2022 | Chen et al. | |
| 11,321,556 | B2 * | 5/2022 | Ham | G06V 10/40 |
| 11,386,306 | B1 * | 7/2022 | Siddiquie | G06V 40/103 |
| 11,417,082 | B2 * | 8/2022 | Zheng | G06Q 30/0643 |
| 11,462,036 | B2 * | 10/2022 | Smith | G06V 30/274 |
| 11,488,410 | B2 * | 11/2022 | Ding | G06F 18/2163 |
| 11,910,784 | B2 * | 2/2024 | Shmigelsky | G06Q 10/06 |
| 12,165,327 | B2 * | 12/2024 | Qi | G06V 10/462 |
| 12,260,330 | B2 * | 3/2025 | Sawada | G06V 10/82 |
| 12,381,915 | B2 * | 8/2025 | Barday | H04L 63/20 |
| 2009/0034791 | A1 | 2/2009 | Doretto et al. | |
| 2018/0307899 | A1 | 10/2018 | Das et al. | |
| 2019/0034716 | A1 * | 1/2019 | Kamarol | G11B 27/031 |
| 2019/0205620 | A1 | 7/2019 | Yi et al. | |
| 2021/0064853 | A1 * | 3/2021 | Ham | G06V 40/172 |
| 2021/0264153 | A1 * | 8/2021 | Viss | G06F 9/54 |
| 2022/0165048 | A1 | 5/2022 | Ham et al. | |
| 2023/0034136 | A1 | 2/2023 | Chow et al. | |
| 2023/0298347 | A1 * | 9/2023 | Tarashima | G06T 7/246 |
| | | | | 382/181 |
| 2024/0005638 | A1 * | 1/2024 | Cho | G06V 10/82 |
| 2024/0221346 | A1 | 7/2024 | Wang et al. | |
| 2024/0264275 | A1 * | 8/2024 | Han | G01S 7/412 |

FOREIGN PATENT DOCUMENTS

| | | | | | |
|---|---|---|---|---|---|
| CN | 111061890 | A | 4/2020 | | |
| CN | 111476222 | A | 7/2020 | | |
| CN | 112652058 | A | 4/2021 | | |
| EP | 3961485 | A1 * | 3/2022 | .......... | G06V 10/806 |
| JP | 2021039740 | A | 3/2021 | | |
| KR | 101941994 | B1 | 1/2019 | | |
| KR | 20190068000 | A | 6/2019 | | |
| KR | 20200015610 | A | 2/2020 | | |
| KR | 20200023221 | A | 3/2020 | | |
| KR | 102127946 | B1 | 6/2020 | | |
| KR | 102187302 | B1 | 12/2020 | | |
| KR | 102225022 | B1 | 3/2021 | | |
| KR | 102225613 | B1 | 3/2021 | | |
| KR | 20220012733 | | 2/2022 | | |
| KR | 20220064204 | | 5/2022 | | |
| KR | 20230164447 | A | 12/2023 | | |

OTHER PUBLICATIONS

Wang et al., 2017, "Attribution Recognition by Joint Recurrent Learning of Context and Correlation" (pp. 531-540) (Year: 2017).*

Matsukawa et al., 2016, "Person Re-Identification Using CNN Features Learned from Combination of Attributes" (pp. 2428-2433) (Year: 2016).*

AI Hub, "Korean re-identification image, " https://aihub.or.kr/aihubdata/data/view.do?currMenu=116&topMenu=100&aihubDataSe=ty&dataSetSn=84, Apr. 3, 2023, 12 pages.

Jiang, B. et al., "AttKGCN: Attribute Knowledge Graph Convolutional Network for Person Re-identification," arXiv:1911.10544v1, Nov. 24, 2019, 8 pages.

Lin, Y. et al., "Improving Person Re-identification by Attribute and Identity Learning," arXiv:1703.07220v3, Accepted to Pattern Recognition, Jun. 9, 2019, 12 pages.

Liu, J. et al., CA3Net: Contextual-Attentional Attribute-Appearance Network for Person Re-Identification, arXiv:1811.07544v1, Nov. 19, 2018, 9 pages.

Eom, C. et al., "Disentangled Representations for Short-Term and Long-Term Person Re-Identification," IEEE Transactions on Pattern Analysis and Machine Intelligence, vol. 44, No. 12, Dec. 2022, 17 pages.

Liu, H. et al., "Deep Relative Distance Learning: Tell the Difference Between Similiar Vehicles," 2016 IEEE Conference on Computer Vision and Pattern Recognition, Jun. 2016, 9 pages.

Liu, X. et al., "PROVID: Progressive and Multimodal Vehicle Reidentification for Large-Scale Urban Surveillance," IEEE Transactions on Multimedia, vol. 20, No. 3, Mar. 2018, 14 pages.

Mirjalili, V., "Semi-adversarial networks for imparting demographic privacy to face images.," Dissertation submitted to Michigan State University, Feb. 2018, 207 pages.

Wang, Q. et al., "Inter-Domain Adaptation Label for Data Augmentation in Vehicle Re-Identification," IEEE Transactions On Multimedia, vol. 24, Aug. 13, 2021, 11 pages.

Wang, Z. et al., "Learning Sparse and Identity-Preserved Hidden Attributes for Person Re-Identification," IEEE Transactions On Image Processing, vol. 29, Oct. 2019, 13 pages.

Xu, W. et al., "Attribute Prototype Networks for Zero-Shot Learning," 34th Conference On Neural Information Processing Systems, May 6, 2021, 12 pages.

* cited by examiner

100

310

LABEL INFORMATION
UPPER BODY COLOR : COMPLEX

320

LABEL INFORMATION
WHETHER TO WEAT A HAT : UNKNOWN

OBJECT RE-IDENTIFICATION APPARATUS AND METHOD THEREOF

CROSS-REFERENCE TO RELATED APPLICATIONS

This application claims the benefit of priority to Korean Patent Application No. 10-2022-0107755, filed in the Korean Intellectual Property Office on Aug. 26, 2022, the entire contents of which are incorporated herein by reference.

TECHNICAL FIELD

The present disclosure relates to an object re-identification apparatus for compressing an object re-identification candidate group based on an attribute and redefining a dataset to improve the accuracy and speed of object re-identification and a method thereof.

BACKGROUND

In general, a person re-identification service system may re-identify many persons at the same time using various cameras and may provide a user with various additional services based on the re-identified result. Due to this, the person re-identification service system should have a fast performance speed and high accuracy to accurately process images of many persons, which are received from various cameras, at the same time.

An existing technology presents a technology for re-identifying a person detected by a visible light camera using a thermal imaging camera to address a problem of a person re-identification method based on the visible light camera vulnerable to a change in illumination. However, the technology for re-identifying the person using the thermal imaging camera may not be expected to improve performance (e.g., accuracy and speed) in different camera environments.

Furthermore, the existing technology presents a technology for extracting a representation (e.g., a feature map) of a pedestrian and an attribute of the pedestrian from an image, fusing the extracted features, and re-identifying the pedestrian to increase the accuracy of a re-identification technology. However, this technology may be effective in a short-term re-identification situation where an attribute does not change, but may have low accuracy in a situation where an attribute changes (e.g., a situation where a pedestrian is holding and putting down a handbag, a situation where the appearance information is changed as the pedestrian wears a coat, or a situation where the lower part of the body is not visible because the pedestrian is obscured by some objects). Furthermore, because this technology separately operates a pedestrian re-identification representation extraction module and an attribute extraction module using one image to perform two artificial intelligence (AI) networks, the performance speed becomes low and many graphics processing unit (GPU) resources (or many processor resources) are used.

SUMMARY

Embodiments provide an object re-identification apparatus for identifying an object re-identification candidate group using an attribute to increase a performance speed and a method thereof.

Further embodiments provide an object re-identification apparatus for implementing AI networks for object reidentification extraction and object attribute extraction as one AI network by a weight sharing method and a method thereof.

Yet other embodiments provide an object re-identification apparatus for redefining an object re-identification dataset based on an attribute and a method thereof.

The technical problems to be solved by the present disclosure are not limited to the aforementioned problems, and any other technical problems not mentioned herein will be clearly understood from the following description by those skilled in the art to which the present disclosure pertains.

According to an embodiment of the present disclosure, an object re-identification apparatus may include a processor. The processor may learn a feature extraction module using a dataset in which an attribute for each object is defined, may receive an image obtained by a camera, may extract an attribute of an object of interest from the image using the learned feature extraction module, may compress an object re-identification candidate group based on the extracted attribute of the object of interest, and may re-identify the object of interest based on the compressed object re-identification candidate group.

The dataset may include an object ID and labeling information in which an attribute of an object is defined for each image.

The attribute may be defined as being "complex", when the object has two or more colors, and may be defined as being "unknown", when there is no portion of the object on the image or is obscured by another object.

The feature extraction module may include a base network that generates a feature map including the overall feature of the object of interest in the image, a first branch network that extracts the attribute of the object of interest from the feature map, and a second branch network that extracts an object representation of the object of interest from the feature map.

The first branch network may be learned using a binary crossentropy loss function.

The second branch network may be learned using an ID classification loss function and a triplet loss function.

The first branch network and the second branch network may filter unnecessary information from the feature map using a spatial mask.

The processor may configure candidate objects registered with an object DB as a tree with respect to an object attribute, may determine whether each node condition of the tree is met based on the attribute of the object of interest, and may add candidate objects according to the determined result to the object re-identification candidate group.

The processor may add one of a time condition, a distance condition, or a combination thereof to the tree.

The processor may calculate a similarity between an object representation included in the object re-identification candidate group and an object representation of the object of interest and may search a candidate object having the highest similarity.

According to another embodiment of the present disclosure, an object re-identification method may include learning a feature extraction module using a dataset in which an attribute for each object is defined, receiving an image obtained by a camera, extracting an attribute of an object of interest from the image using the learned feature extraction module, compressing an object re-identification candidate group based on the extracted attribute of the object of interest, and re-identifying the object of interest based on the compressed object re-identification candidate group.

The dataset may include an object ID and label information in which an attribute of an object is defined for each image.

The attribute may be defined as being "complex", when the object has two or more colors, and may be defined as being "unknown", when there is no portion of the object on the image or is obscured by another object.

The extracting of the attribute of the object of interest may include generating a feature map including the overall feature of the object of interest in the image using a base network included in the feature extraction module and extracting the attribute of the object of interest from the feature map using a first branch network included in the feature extraction module.

The first branch network may be learned using a binary crossentropy loss function.

The extracting of the attribute of the object of interest may further include extracting an object representation of the object of interest from the feature map using a second branch network included in the feature extraction module.

The second branch network may be learned using an ID classification loss function and a triplet loss function.

The first branch network and the second branch network may filter unnecessary information from the feature map using a spatial mask.

The compressing of the object re-identification candidate group may include configuring candidate objects registered with an object DB as a tree with respect to an object attribute, determining whether each node condition of the tree is met based on the attribute of the object of interest, and adding candidate objects according to the determined result to the object re-identification candidate group.

The re-identifying of the object of interest may include calculating a similarity between an object representation included in the object re-identification candidate group and an object representation of the object of interest and searching a candidate object having the highest similarity.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
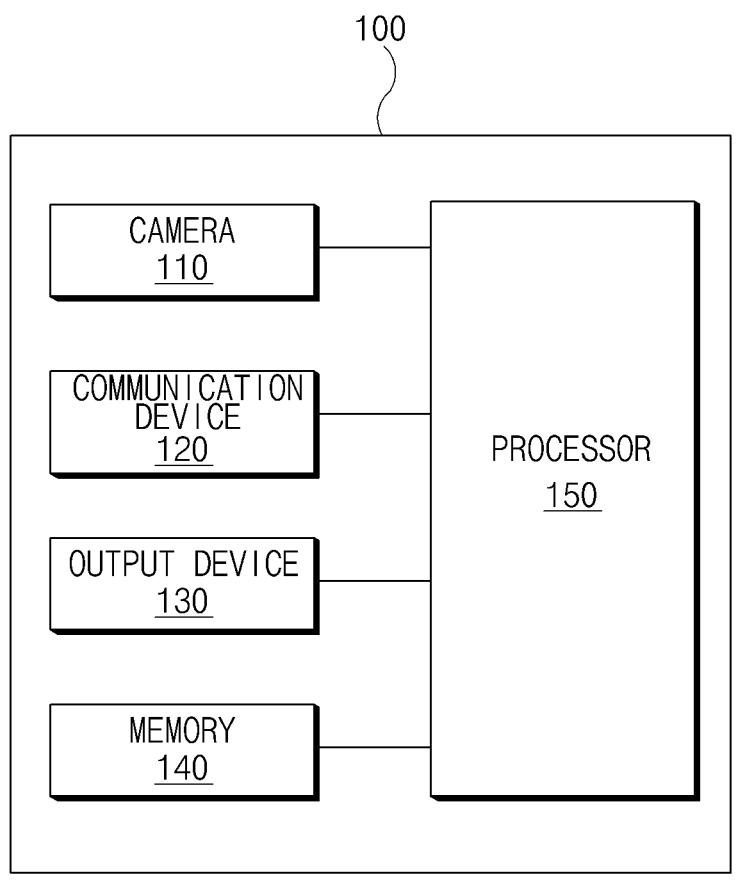
FIG. 1 is a block diagram illustrating a configuration of an object re-identification apparatus according to embodiments of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

An object may be a person, a vehicle, or the like in the specification, but it is assumed that the object is the person to help understand the present disclosure.

FIG. 1 is a block diagram illustrating a configuration of an object re-identification apparatus according to embodiments of the present disclosure.

An object re-identification apparatus 100 may be applied to various environments capable of recognizing a user such as a robot, a branch, a gas station, or an electric vehicle charging station and providing a service based on information associated with the user.

Referring to FIG. 1, the object re-identification apparatus 100 may include a camera 110, a communication device 120, an output device 130, a memory 140, and a processor 150.

The camera no may obtain an image including an object in real time or at intervals of a predetermined time. The camera no may include a visible light camera, a thermal imaging camera, and/or the like.

The communication device 120 may assist in performing wired or wireless communication between the object re-identification apparatus 100 and an external electronic device (e.g., a closed circuit television (CCTV), a smartphone, a server, or the like). The communication device 120 may communicate with the external electronic device using a wired communication technology, such as a local area network (LAN), a wide area network (WAN), an Ethernet, and/or an integrated services digital network (ISDN), and/or a wireless communication technology, such as a wireless LAN (WLAN) (Wi-Fi), wireless broadband (Wibro), Bluetooth, near field communication (NFC), radio frequency identification (RFID), infrared data association (IrDA), long term evolution (LTE), LTE-advanced (LTE-A), and international mobile telecommunication (IMT)-2020. The communication device 120 may include a communication processor, a communication circuit, an antenna, a transceiver, and/or the like.

The output device 130 may output visual information, audible information, and/or the like, which may include a display, a speaker, and/or the like. The display may be implemented as a liquid crystal display (LCD), a thin film transistor-liquid crystal display (TFT-LCD), an organic light-emitting diode (OLED) display, a flexible display, a three-dimensional (3D) display, a transparent display, a head-up display (HUD), a touch screen, or the like. When the output device 130 is implemented as the touch screen, it may also be used as an input device.

The memory 140 may store a dataset in which an attribute for each object is defined. The dataset may be a database (DB) in which an identification (ID) of an object is divided and an attribute is labeled. An object DB, a candidate queue, and the like may be implemented in the memory 140. The memory 140 may store one AI network (or a single model) which extracts an object attribute and an object representation, an object re-identification algorithm, a learning loss function, and the like.

The memory 140 may be a non-transitory storage medium which stores instructions executed by the processor 150. The memory 140 may include at least one of storage media such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), or an erasable and programmable ROM (EPROM).

The processor 150 may be electrically connected with the camera no, the communication device 120, the output device 130, and the memory 140. The processor 150 may control the overall operation of the object re-identification apparatus 100. The processor 150 may be implemented as at least one of processing devices such as a graphics processing unit (GPU), an application specific integrated circuit (ASIC), a digital signal processor (DSP), a programmable logic device (PLD), a field programmable gate array (FPGA), a central processing unit (CPU), a microcontroller, or a microprocessor.

The processor 150 may learn the AI network using the dataset. The dataset may include an ID assigned for each object and labeling information in which an attribute is defined for each image of each object. When an attribute is labeled for each image, a class considering an actual situation may be defined. As an example, when it is difficult to define an object included in the image using a specific color because the object includes at least two colors, an object attribute may be defined as being "complex". Furthermore, when it is difficult to define the attribute because at least a portion of the object is not included in the image or is obscured by another object, the object attribute may be defined as being "unknown".

The AI network may learn an attribute for each object using the dataset. For improved learning and use of the AI network (or a deep learning model), attributes may be grouped to generate an attribute group. For example, as shown in Table 1 below, the human attribute group may be classified into identity (I), carrying (C), a head (H), an upper body (U), and a low body (L).

TABLE 1

| Group | Meaning |
| --- | --- |
| I (Identity) | Global features of person (e.g., gender, age, or the like) |
| C (Carrying) | Features of goods carried by person (e.g., whether bag is worn, whether belongings are worn, or the like) |
| H (Head) | Head features of person (e.g., whether hat is worn, hair length, or the like) |
| U (Upper body) | Upper body features of person (e.g., color of top, sleeve length, or the like) |
| L (Lower body) | Lower body features of person (e.g., color of bottoms, type of bottoms, or the like) |

The processor 150 may receive a plurality of images from the camera 110. The present embodiment describes the case where the processor 150 receives the image from the camera 110 as an example, but not limited thereto. The processor 150 may be implemented to receive an image from the outside through the communication device 120.

The processor 150 may select an object of interest (e.g., a person) from the plurality of received images. The processor 150 may extract an attribute and an object representation of the object of interest from the plurality of images using the learned AI network.

The processor 150 may compress an object re-identification candidate group in objects stored in an object DB based on the extracted attribute. In other words, the processor 150 may extract an object having an attribute which is similar to the attribute of the extracted object of interest over a predetermined threshold among the objects stored in the object DB as a candidate object (or an object candidate) for object re-identification.

The processor 150 may re-identify the object of interest in the compressed object re-identification candidate group based on the extracted object representation. The processor 150 may search for (or discover) a candidate object having an object representation which is similar to the extracted object representation over a predetermined threshold as a re-identification object in the object re-identification candidate group. The processor 150 may output an ID of the found re-identification object (i.e., the object of interest).

Figure 2:
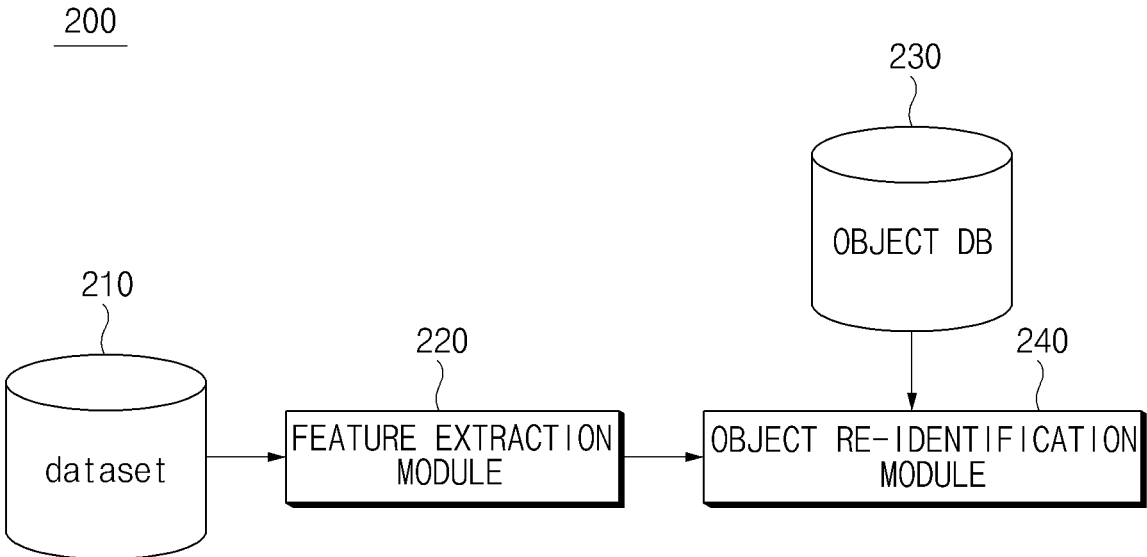
FIG. 2 is a drawing illustrating a configuration of an object re-identification process framework according to an embodiment of the present disclosure.
Figure 3:
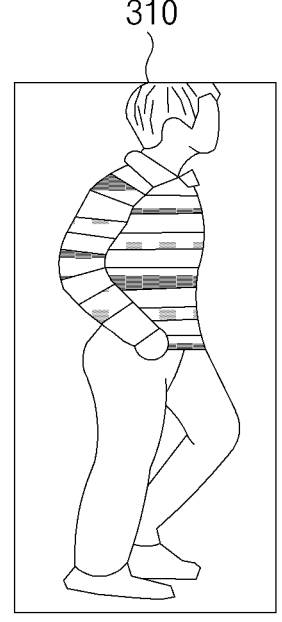
FIG. 3 is a drawing describing labeling according to an attribute according to an embodiment of the present disclosure.
Figure 3:
Figure 4:
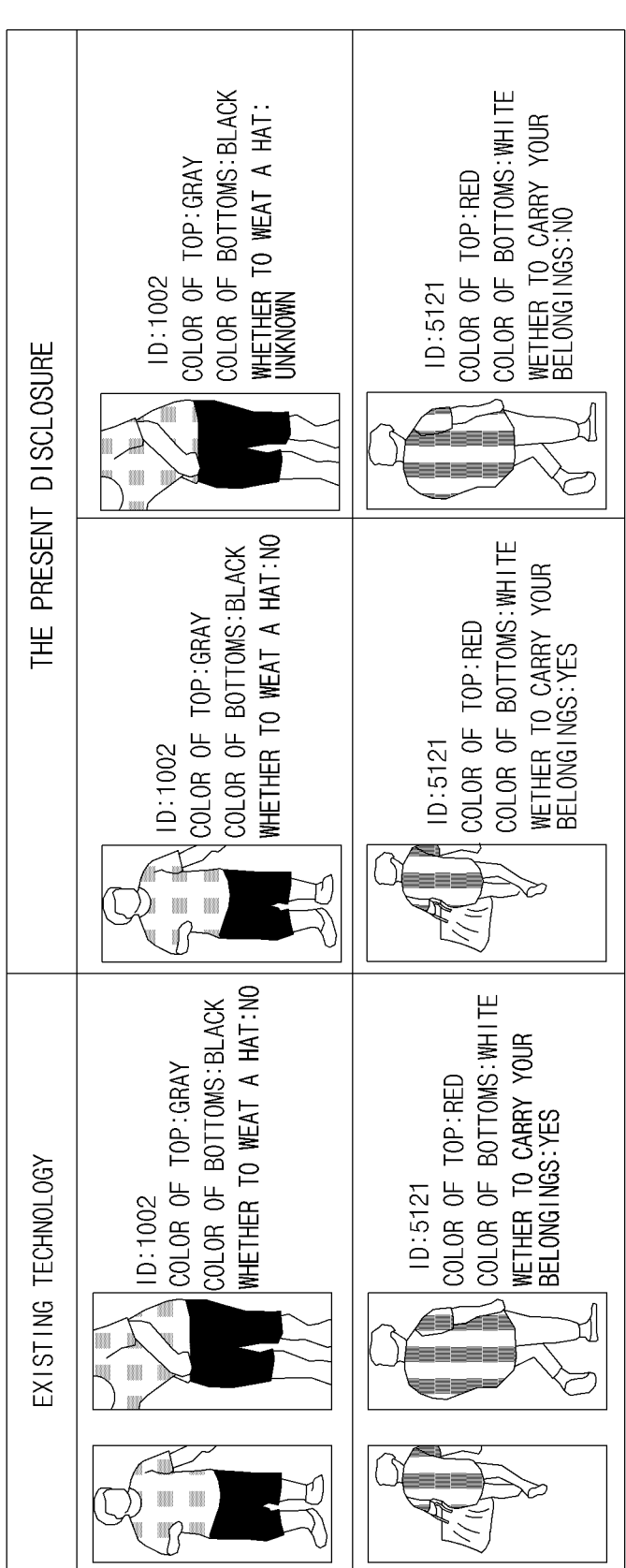
FIG. 4 is a drawing comparing and describing labeling according to an embodiment of the present disclosure with existing labeling.

FIG. 2 is a drawing illustrating a configuration of an object re-identification process framework according to an embodiment of the present disclosure. FIG. 3 is a drawing describing labeling according to an attribute according to an embodiment of the present disclosure. FIG. 4 is a drawing comparing and describing labeling according to an embodiment of the present disclosure with existing labeling.

An object re-identification process framework 200 may include a dataset 210, a feature extraction module 220, an object DB 230, and an object re-identification module 240. The object re-identification process framework 200 may perform a training process and an inference process. The training process may be performed by means of the dataset 210 and the feature extraction module 220. The inference process may be performed by means of the feature extraction module 220, the object DB 230, and the object re-identification module 240.

The dataset 210 may include an ID assigned for an object and labeling information for each object image. The labeling information may include an attribute defined for a corresponding object in an object image. As an example, when it is difficult to define an object included in the image using a specific color because the object has at least two colors, an attribute may be defined as being "complex". As another example, when it is difficult to define the attribute because at least a portion of the object is not included in the image or is obscured by another object, the attribute may be defined as being "unknown".

Referring to FIG. 3, when a color of top of a person included in an image 310 includes another color other than a blue color, the color of top is labeled as the "blue" in an existing technology. In the present embodiment, the color of top of the person may be labeled as being "complex". Furthermore, when an image 320 does not include a head portion of a person, whether a hat is worn is labeled as "No" in the existing technology. However, in the present embodiment, whether the hat is worn may be labeled as being "unknown".

Referring to FIG. 4, because labeling is performed based on an ID of an object in an existing technology, for the same ID, that is, the same object, attributes for all images matched with the object are labeled in the same manner. In the present embodiment, because labeling is performed based on the image, when attributes of the same object included in the plurality of images to which the same ID is assigned are different from each other, the attributes of the same object are differently labeled for each image.

The dataset 210 may include a table in which an attribute group and labeling information are defined for each attribute as shown in Table 2 below for each object.

TABLE 2

| Attribute | Attribute group | Labeling |
|---|---|---|
| Gender | I | Unknown (0), Male (1), Female (2) |
| Age | I | Unknown (0), Child (1), Adult (2) |
| Hair length | H | Unknown (0), Short hair (1), Long hair (2) |
| Sleeve length | U | Unknown (0), Short sleeve (1), Long sleeve (2) |
| . . . | . . . | . . . |
| Color of bottoms | L | Unknown (0), Black (1), White (2), . . . , Blue (8), Complex (9) |
| When bag is worn | C | Unknown (0), No (1), Yes (2) |
| When belongings are worn | C | Unknown (0), No (1), Yes (2) |

The feature extraction module 220 may extract an object attribute and an object representation from an input image by means of one AI network. The attribute may be a person attribute query which is a combination in which attributes derived by means of the AI network are collected for each group. The object representation may be defined as a representation for object re-identification derived by means of the AI network.

The object DB 230 may include information for re-identifying a previously registered object or objects to be searched for. The object DB 230 may be implemented in the form of a table in which an ID for each object, an object representation, an object attribute, an identification date and time, and the like are defined. For example, as shown in Table 3 below, an ID for each person, a person representation, a person attribute, an identification date and time, and the like may be stored in the form of a table in the object DB 230.

TABLE 3

| ID | Person representation | Person attribute | Identification date and time | . . . |
|---|---|---|---|---|
| 1001 | 123, 43, . . . , 47 | G: Male, Child H: Hair wearing, Short | Mar. 18, 2022 At 14:55:30 | . . . |

TABLE 3-continued

| ID | Person representation | Person attribute | Identification date and time | . . . |
|---|---|---|---|---|
| | | hair . . . . . . | | |

The object re-identification module 240 may compress an object re-identification candidate group in the object DB 230 based on the attribute output from the feature extraction module 220. The object re-identification module 240 may extract an object candidate group for object re-identification among objects (or candidate objects) registered with the object DB 230 based on the object attribute extracted from the feature extraction module 220.

The object re-identification module 240 may search for (or discover) a re-identification object from the object re-identification candidate group compressed based on the object representation extracted from the feature extraction module 220. The object re-identification module 240 may search for an object representation which is similar to the extracted object representation over a predetermined threshold and may output an ID of an object matched with the found object representation.

Figure 5:
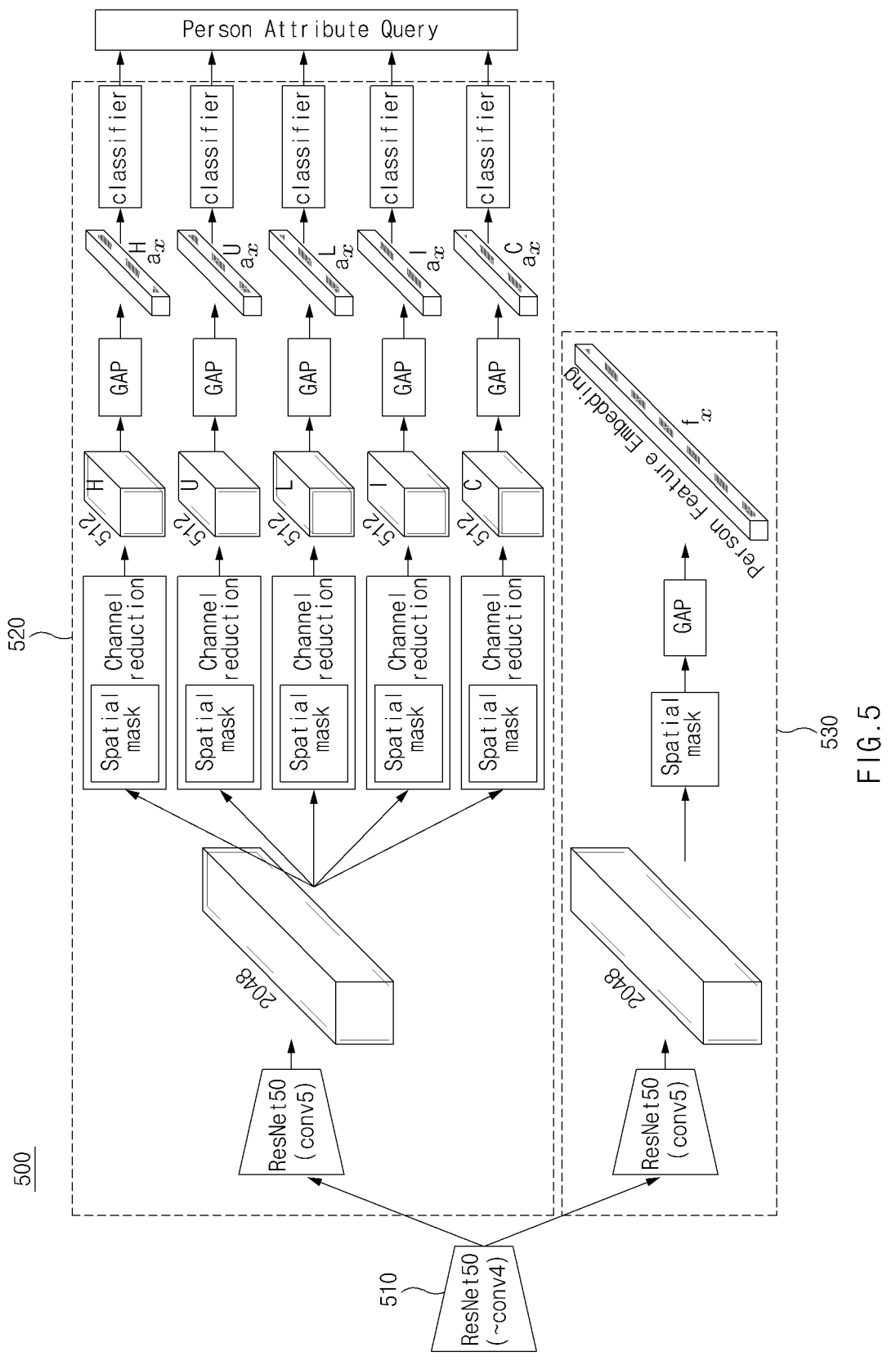
FIG. 5 is a drawing describing a feature extraction module according to an embodiment of the present disclosure.
Figure 6:
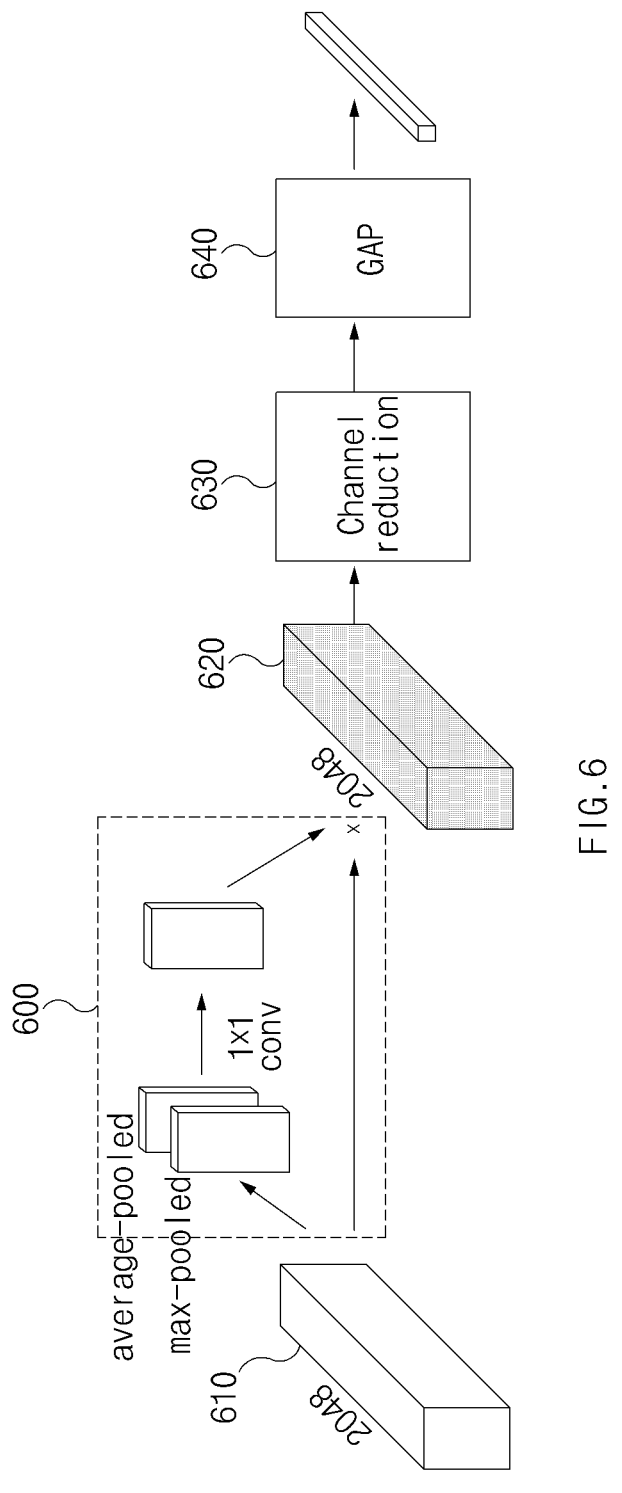
FIG. 6 is a drawing describing a spatial mask according to an embodiment of the present disclosure.

FIG. 5 is a drawing describing a feature extraction module according to an embodiment of the present disclosure. FIG. 6 is a drawing describing a spatial mask according to an embodiment of the present disclosure.

A feature extraction module 220 of FIG. 2 may perform two tasks (i.e., attribute extraction and object representation extraction) using a single AI network 500 which shares a weight. The single AI network 500 may include a base network 510, a first branch network 520, and a second branch network 530.

The base network 510 may receive an image as an input. The base network 510 may receive an image transmitted from a camera no of FIG. 1. The case where the base network 510 receives one image as an input is described as an example to help understand the description in the present embodiment, but not limited thereto. The base network 510 may receive two or more images.

The base network 510 may specify an object of interest among objects included in the received image. The base network 510 may encode overall features of the object of interest which is indicated in the received image. In other words, the base network 510 may extract the overall features of the object of interest from the received image to generate a feature map.

The first branch network 520 and the second branch network 530 may recognize each object again based on features, that is, a feature map encoded in the base network 510 and may extract pieces of information specialized in predicting (or dividing) an attribute of the object. A spatial prediction model 600 for predicting a spatial area important for a subtask may be inserted into a front stage of the first branch network 520 and the second branch network 530.

Referring to FIG. 6, the space prediction module 600 may receive the extracted feature map 610 from the base network 510. The spatial prediction model 600 may multiply the feature map 610 by the spatial mask to remove unnecessary information and may proceed with a subtask. The spatial mask may be implemented by max pooling, average pooling, and 1×1 convolution. In other words, the spatial prediction model 600 may filter unnecessary information from the extracted feature map 610 using the max pooling and the average pooling.

After the unnecessary information is filtered from the extracted feature map 610, the first branch network 520 and the second branch network 530 may perform channel reduction 630 for the filtered feature map 620. Next, the first branch network 520 and the second branch network 530 may perform global average pooling (GAP) 640 for the filtered feature map 620, the channel of which is reduced.

The first branch network 520 may perform an independent attribute extraction process for each attribute group which is grouped by attributes with a high correlation. Thus, the first branch network 520 may extract attributes $a_x^H$, $a_x^U$, $a_x^L$, $a_x^I$, and $a_x^C$ for each attribute group.

The first branch network 520 may learn an attribute for each object, which is included in a dataset, using an attribute loss function like Equation 1 below. A binary crossentropy loss function may be used as the attribute loss function. The first branch network 520 may define a loss of an attribute labeled as being "unknown" upon learning using the dataset as "o" and may exclude the attribute from learning.

[Equation 1]

attribute loss function =

$$-\frac{1}{|g|}\sum_{G\in g}\left(l_{x,k}^G \log\ s\!\left(w_k^G, a_x^G\right) + \left(1 - l_{x,k}^G\right)\!\left(1 - \log\ s\!\left(w_k^G, a_x^G\right)\right)\right)$$

Herein, $l_{x,k}^G$ denotes the kth attribute label in the specific attribute group $G\in\{H, U, L, I, C\}$ of the xth data, and it is represented that there is the corresponding attribute in the xth data, when $l_{x,k}^G$ is 1, and it is represented that there is no corresponding attribute in the xth data when $l_{x,k}^G$ is o. For example, it may be defined as $l_{5,14}^C=1$, when holding a handbag which is the 14th attribute in the carrying group of the 5th data, whereas it may be defined as $l_{5,14}^C=0$, when not holding the handbag.

When there is the kth attribute for the specific attribute group, that is, when $l_{x,k}^G=1$, the first branch network 520 may increase a similarity (s) between an attribute representation $a_x^G$ and a weight $w_k^G$ of the kth attribute classifier and may learn information that there is the corresponding attribute in the input image. On the other hand, when there is no kth attribute for the specific attribute group, that is, when $l_{x,k}^G=0$, the first branch network 520 may proceed with learning in a manner which decreases a similarity between the attribute representation $a_x^G$ and the weight $w_k^G$ of the corresponding attribute classifier.

The second branch network 530 may perform the GAP 640 for the feature map 620 filtered by the spatial mask to extract an object representation (e.g., person feature embedding).

The second branch network 530 may learn an object representation using an ID classification loss function and a triplet loss function. The ID classification loss function is a loss function derived such that related information is able to be included in the extracted object representation $f_x$ to predict ID labeling $y_x$ of a corresponding object from the object representation $f_x$. The triplet loss function is a loss function for performing learning such that a distance between the object representation $f_x$ and a representation $f_n$ having a different ID from the object representation $f_x$ is further than a distance between the object representation $f_x$ and a representation $f_p$ having the same ID as the object representation $f_x$ and learning a difference between objects.

re-identification loss function=$(-\log\ p(y_x|f_x)+\log(1+$
$\exp(d(f_x,f_p)-d(f_x,f_n))))$      [Equation 2]

Herein, p refers to the classification probability, and d refers to the distance.

Referring to Table 4 below, it may be identified that, when operating while sharing all layers (or when a feature is extracted by means of an AI network without a branch network), the accuracy of object re-identification shows a function similar to when operating while sharing only a base network (or when a feature is extracted by means of an AI network including a branch network), but has a considerably low average prediction accuracy of the attribute. This may mean that key information necessary for object re-identification and key information necessary for attribute prediction conflict with each other. As the base network is shared, but a module specialized for each task is present, it may be identified that high performance is shown in both of two tasks.

TABLE 4

| | Accuracy of re-identification (Rank-1) | Average prediction accuracy of attribute (mA) |
| --- | --- | --- |
| Share all layers | 95.19% | 78.61% |
| Share base network | 95.22% | 89.39% |

Figure 7:
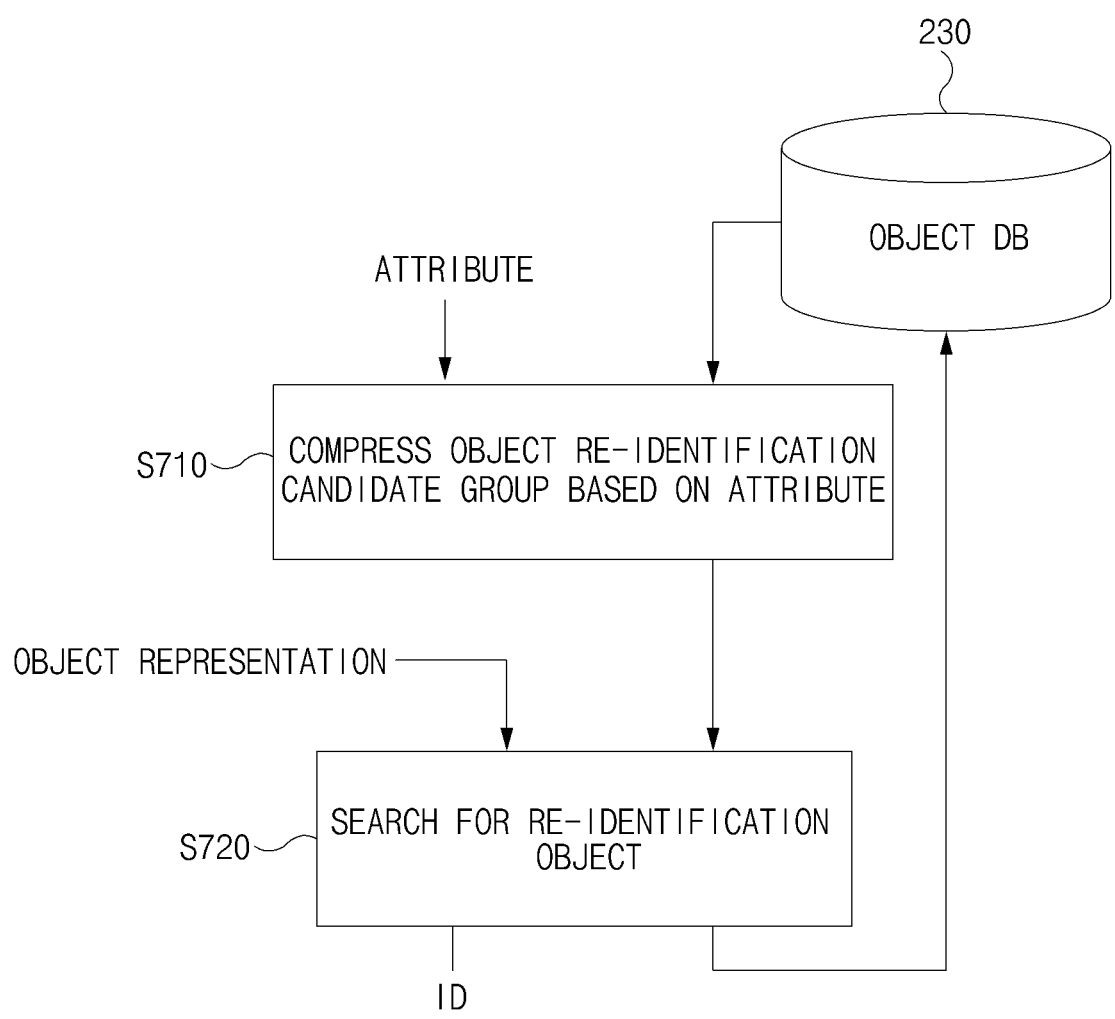
FIG. 7 is a drawing describing an operation of an object re-identification module according to an embodiment of the present disclosure.
Figure 8:
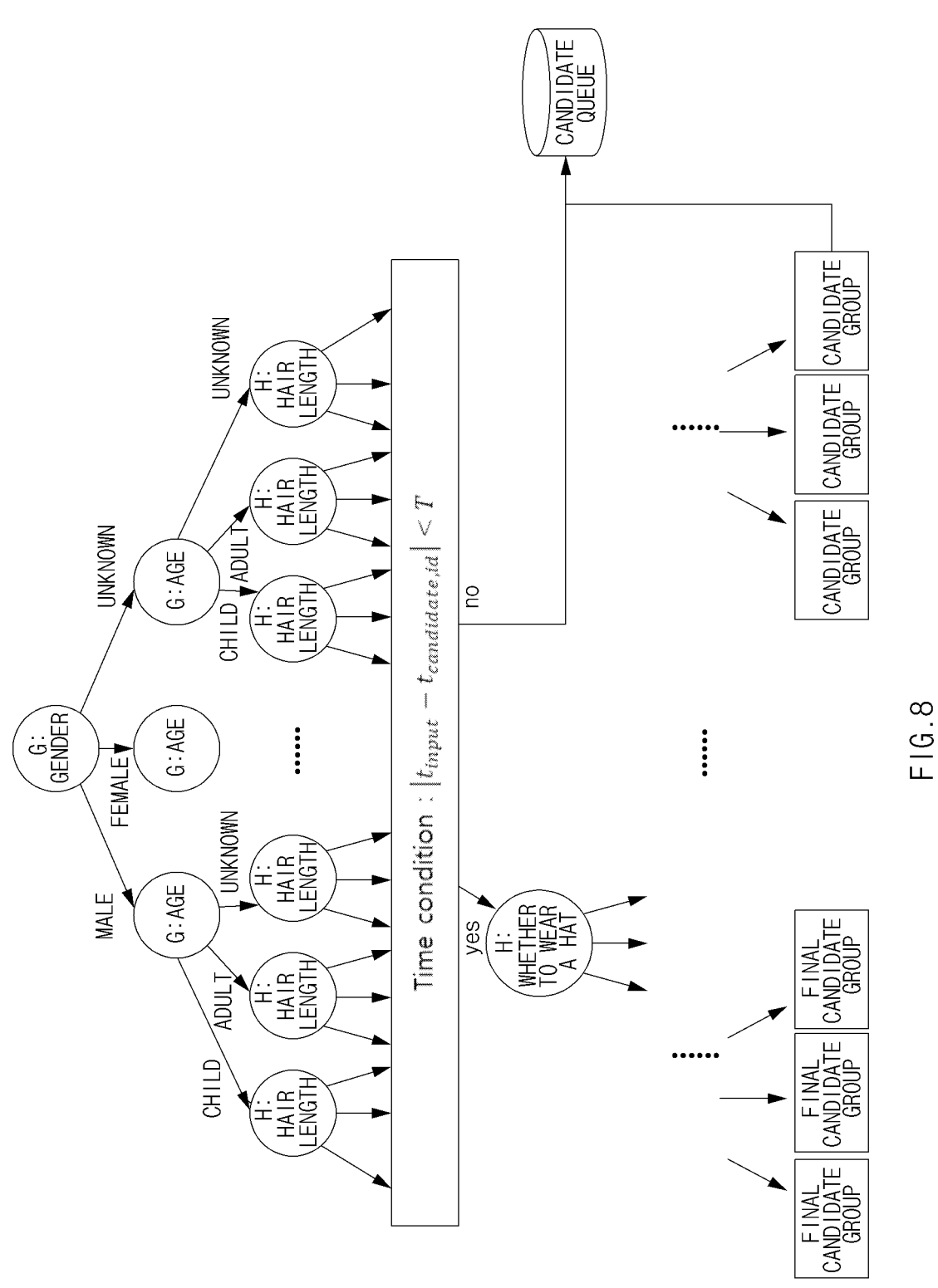
FIG. 8 is a drawing illustrating an example of configuring an attribute tree according to an embodiment of the present disclosure.

FIG. 7 is a drawing describing an operation of an object re-identification module according to an embodiment of the present disclosure. FIG. 8 is a drawing illustrating an example of configuring an attribute tree according to an embodiment of the present disclosure.

Referring to FIG. 7, an object re-identification module 240 of FIG. 2 may receive an attribute and an object representation output from a feature extraction module 220 of FIG. 2.

In S710, the object re-identification module 240 may compress an object re-identification candidate group in objects stored in an object DB 230 based on the attribute. The object re-identification module 240 may extract an object, having an attribute similar to at least a portion of the object attribute extracted by the feature extraction module 220, from the object DB 230.

The object re-identification module 240 may configure object re-identification candidates (or search candidates) as a tree as shown in FIG. 8 with respect to an object attribute of the object DB 230. When configuring an attribute tree, as shown in FIG. 8, a time condition C may be added to an upper node of clothing information which may change over time. Furthermore, at least one condition among a time, a distance, or a combination thereof may be set according to a service when an attribute tree is configured. Several conditions may be used together, and the condition may be subdivided and added stage by stage according to an attribute. The object re-identification module 240 may perform a determination of a sub-node condition when a predetermined specific condition is met and may add objects which do not meet the predetermined specific condition to a candidate queue. For example, in the attribute tree of FIG. 8, the object re-identification module 240 may perform the sub-node condition (e.g., whether a hat is worn) when the time condition is met, and may add objects meeting a gender, an age, and a hair length to the candidate queue when the time condition is not met.

The object re-identification module 240 may add a final candidate object, derived by performing all of determinations of the tree condition as shown in FIG. 8 with respect to an attribute of an input object, to the candidate queue. At this time, when "unknown" while performing the tree condition, the object re-identification module 240 may fail to compress an object re-identification candidate in a corresponding attribute condition.

As the object re-identification candidate group is compressed, the number of candidates to be searched for may be compressed by the number h of maximum attributes. The number of object search candidates which are compressed maximally may be defined as a value (n/h) obtained by dividing the number n of all object search candidates by the number h of maximum attributes. This may effectively improve the performance speed for a service which searches for tens of thousands of people, and a problem in which accuracy is degraded according to a change in attribute through condition C may be improved.

For example, when the input human attributes are male, child, and short hair, and whether the hat is worn, when the color of top is "blue", and when the upper body length is "unknown", the object re-identification module 240 may compress persons, who have male, child, and short hair as attributes, as person re-identification candidates using the tree of the object DB 230. At this time, the object re-identification module 240 may determine a lower body tree condition, when a difference between a current date and a time $t_{input}$ of an input person and an identification date and a time $t_{candidate,id}$ of t each of person re-identification candidates is less than a threshold T, and may add a person re-identification candidate which does not meet the lower body tree condition among person re-identification candidates to the candidate queue.

When the lower body tree condition is met, the object re-identification module 240 may compress person re-identification candidates as candidates, the colors of top of which are blue. Thereafter, when it is able to know the upper body length, the object re-identification module 240 may determine a lower body node condition (i.e., whether a condition is met) in both of when the upper body length is short and when the upper body length is long. The object re-identification module 240 may determine all node conditions of the tree and may add the compressed person re-identification candidates to the candidate queue.

In S720, the object re-identification module 240 may search the compressed object re-identification candidate group for a re-identification object based on the object representation. The object re-identification module 240 may obtain a similarity between a person representation fcandidate,id stored in the candidate queue and the input person representations finput and may discover a candidate having the highest similarity. The object re-identification module 240 may calculate a similarity between the person representation fcandidate,id stored in the candidate queue and the input person representation finput using cossim (finput, fcandidate,id). The object re-identification module 240 may output an ID of a corresponding re-identification object after the discovery is completed and may update data of the object DB 230 with respect to a current input such as an object attribute, an identification date and time, and the like of the ID.

Figure 9:
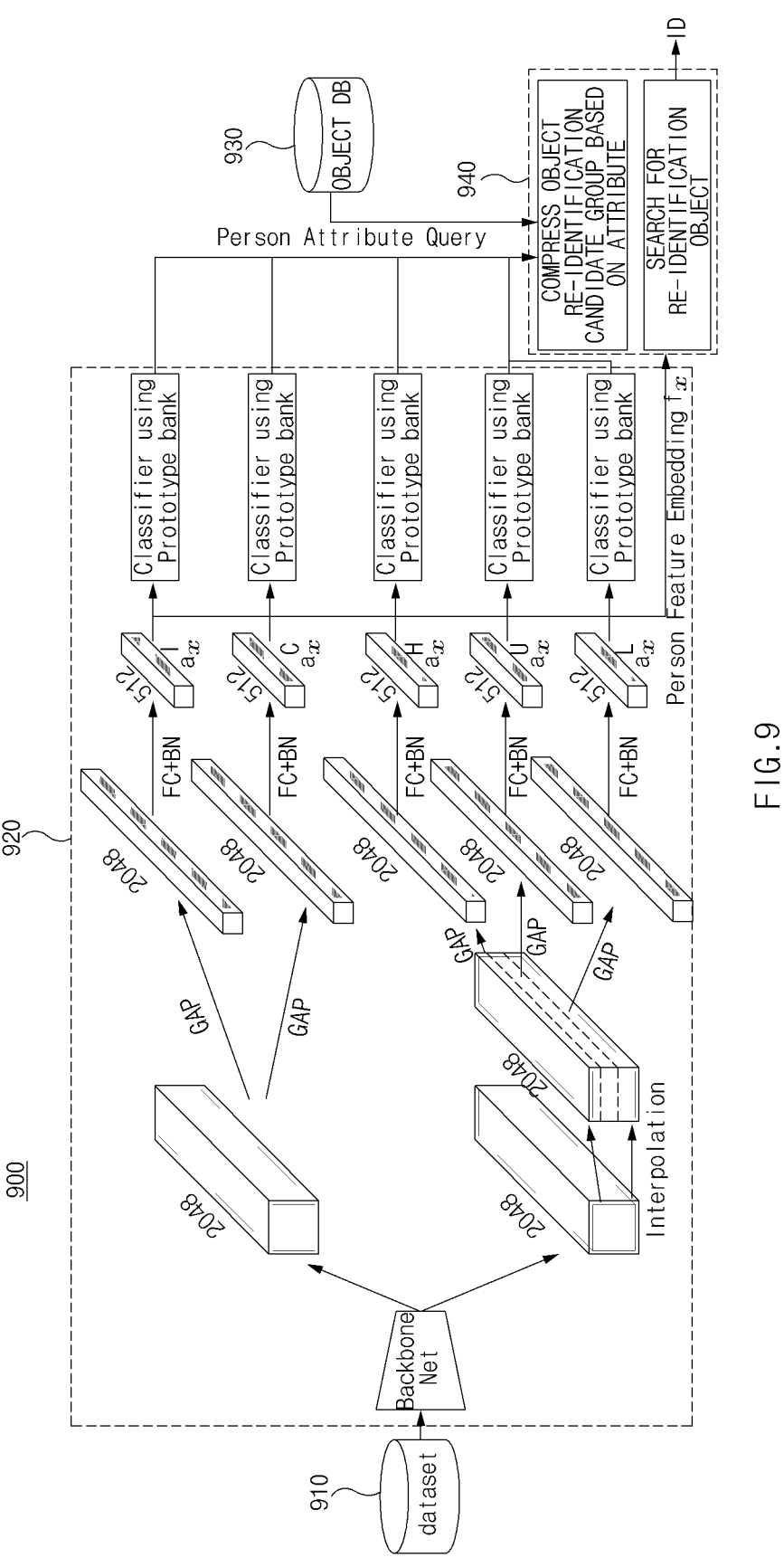
FIG. 9 is a drawing describing a configuration of an object re-identification process framework according to another embodiment of the present disclosure.

FIG. 9 is a drawing describing a configuration of an object re-identification process framework according to another embodiment of the present disclosure.

Referring to FIG. 9, an object re-identification process framework 900 may include a dataset 910, a feature extraction module 920, an object DB 930, and an object re-identification module 940. Herein, because the dataset 910, the object DB 930, and the object re-identification module 940 correspond to a dataset 210, an object DB 230, and an object re-identification module 240, respectively, a description of the corresponding components will be omitted.

The feature extraction module 920 may learn an attribute for each object using the dataset 910. The feature extraction module 920 may extract an object representation based on the attribute from an input image. The feature extraction module 920 may extract an object representation based on the attribute using a person representations extraction method disclosed in Korean Patent Application No. 10-2022-0064204 previously filed by the present applicant.

Figure 10:
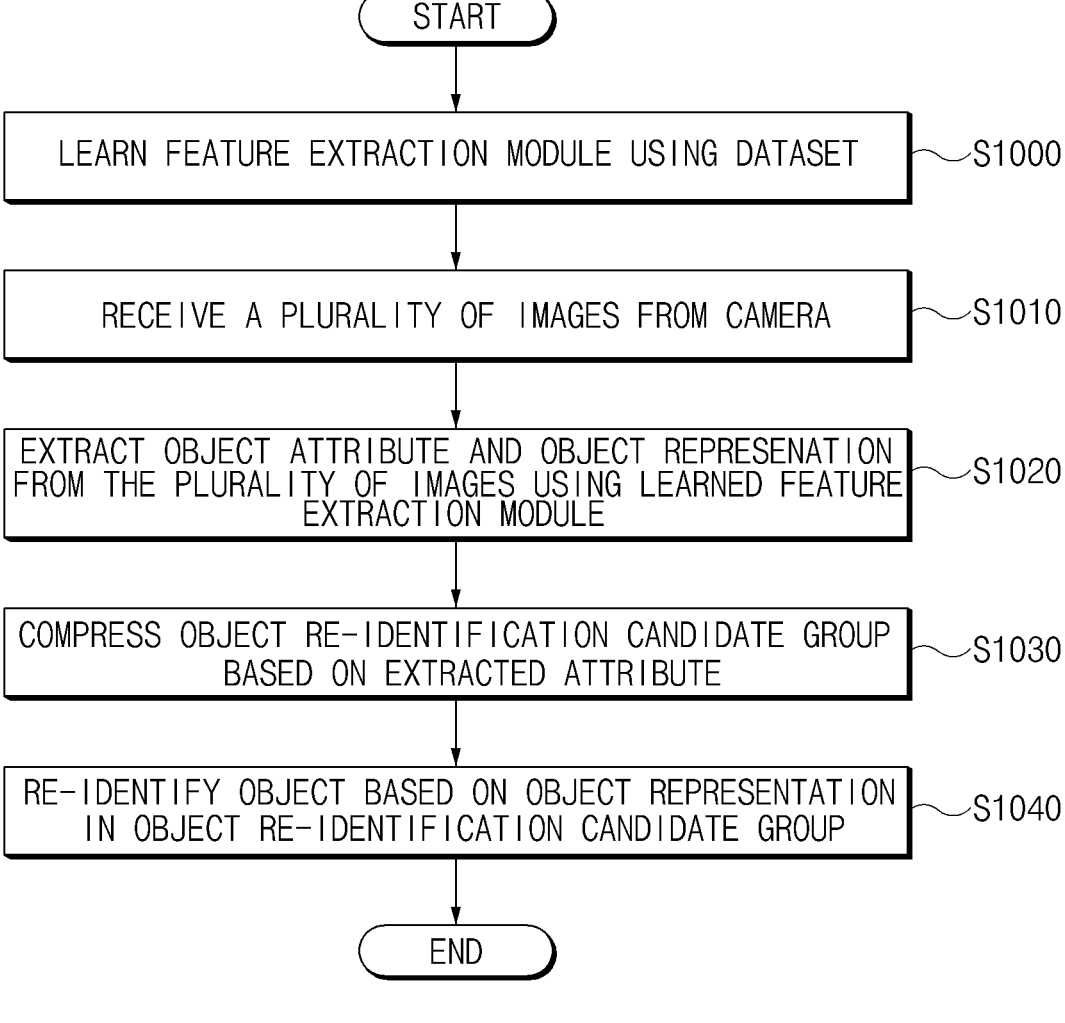
FIG. 10 is a flowchart illustrating an object re-identification method according to embodiments of the present disclosure.

FIG. 10 is a flowchart illustrating an object re-identification method according to embodiments of the present disclosure.

In S1000, a processor 150 of FIG. 1 may learn a feature extraction module 220 of FIG. 2 using a dataset 210 of FIG. 2. The feature extraction module 220 may learn an attribute for each object, which is included in the dataset 210.

In Slow, the processor 150 may receive a plurality of images from a camera no of FIG. 1. Receiving the image from the camera no is disclosed in the present embodiment, but not limited thereto. An image may be received from the outside through a communication device 120 of FIG. 1 or an interface (not shown).

In S1020, the processor 150 may extract an object attribute and an object representation from the plurality of images using the learned feature extraction module 220. The feature extraction module 220 may extract an attribute of an object of interest from the input image. Furthermore, the feature extraction module 220 may extract an object representation of the object of interest based on the input image.

In S1030, the processor 150 may compress an object re-identification candidate group based on the extracted attribute. The processor 150 may extract an object candidate from an object DB 230 of FIG. 2 based on the extracted attribute.

In S1040, the processor 150 may perform object re-identification in an object re-identification candidate group based on the object representation. The processor 150 may extract an object candidate, which has an object representation which is similar to the extracted object representation over a predetermined threshold, as a re-identification object (or the same object as the object of interest).

Figure 11:
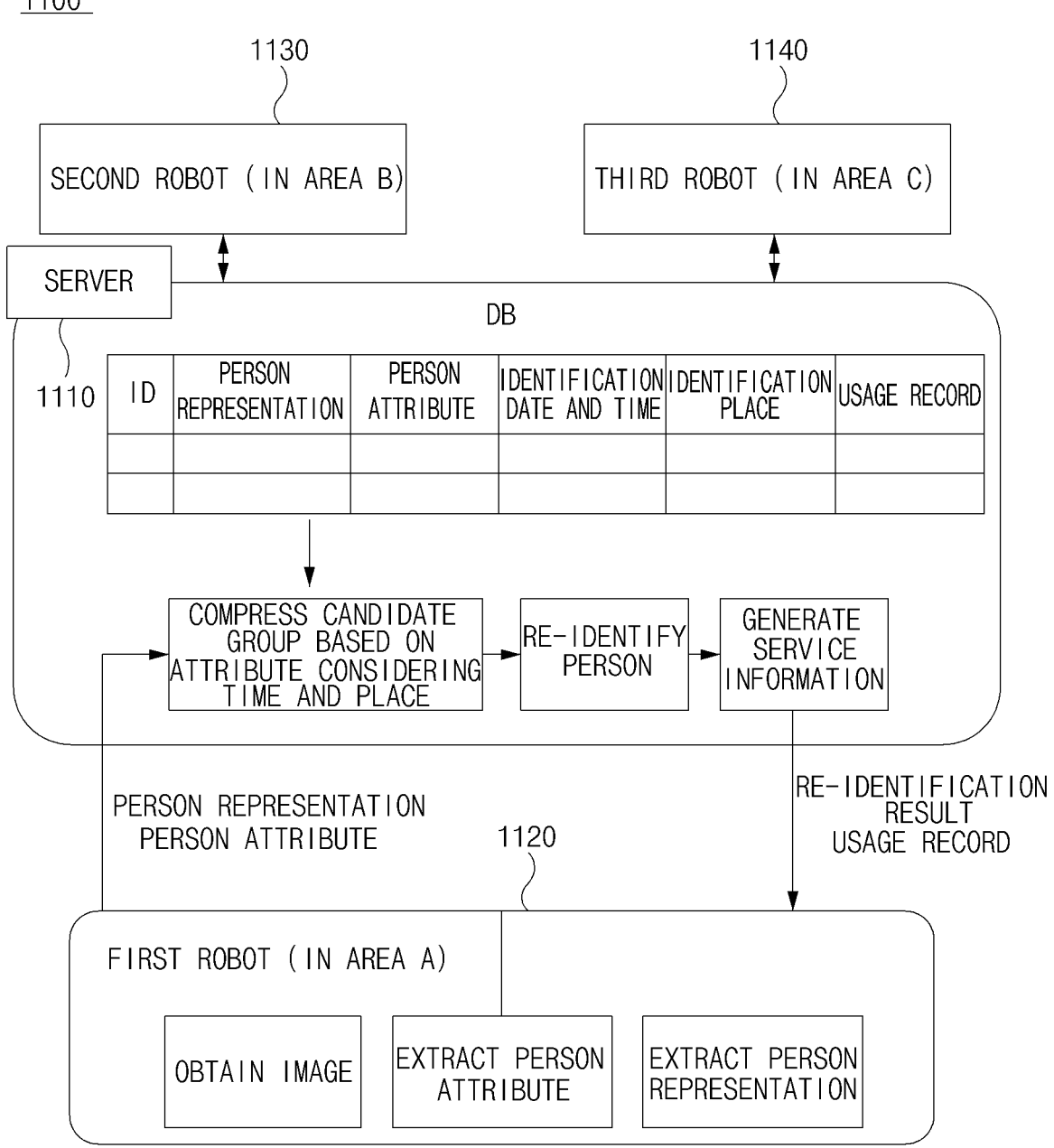
FIG. 11 is a drawing illustrating a method for providing an object re-identification service of a robot according to embodiments of the present disclosure.

FIG. 11 is a drawing illustrating a method for providing an object re-identification service of a robot according to embodiments of the present disclosure.

Referring to FIG. 11, a robot service system 1100 may include a server 1110 and first to third robots 1120 to 1140 which are located at branches of different areas.

The first robot 1120 may obtain an image including a specific person (i.e., a visitor) who visits a branch in area A by means of a camera. The first robot 1120 may extract an attribute of a specific person from the obtained image. Furthermore, the first robot 1120 may extract a person representation of the specific person from the obtained image. The first robot 1120 may transmit the extracted attribute and the extracted person representation of the specific person to the server 1110. The first robot 1120 may transmit the attribute and the person representation to the server 1110 to request the server 1110 to re-identify a person.

The server 1110 may receive the person attribute and the person representation transmitted from the first robot 1120 using a communication circuit or the like. The server 1110 may compress a candidate group based on the received attribute with regard to a time, a place, and/or the like in objects stored in a DB. The server 1110 may perform person re-identification from the compressed candidate group based on the received person representation. The server 1110 may search the compressed candidate group for a candidate person including a person representation matched with the received person representation. The server 1110 may generate a re-identification result and a usage record as service information. The server 1110 may transmit the generated service information to the first robot 1120. The first robot 1120 may provide vehicle guidance based on the service information.

Thereafter, when a specific person who visits a branch in area A visits a branch in area B, the second robot 1130 may obtain an image by means of the camera and may extract a person attribute and a person representation from the obtained image. The second robot 1130 may transmit the extracted person attribute and the extracted person representation to the server 1110 to request the server 1110 to re-identify a person. The second robot 1130 may provide a service to a specific person based on the re-identification result and the usage record transmitted from the server 1110. For example, the second robot 1130 may re-identify a specific person which visits a branch in area B and may provide an advance information service "How was the previous ∞ vehicle guidance?" based on a usage record of the specific person re-identified in the branch in area A.

The third robot 1140 located in the branch in area C may obtain an image by means of the camera together with the first robot 1120 and the second robot 1130 and may extract a person attribute and a person representation from the obtained image. Furthermore, the third robot 1140 may transmit a person re-identification request including the extracted person attribute and the extracted person representation to the server 1110. Next, the third robot 1140 may provide a service based on the person re-identification result transmitted from the server 1110.

In the above-mentioned embodiment, the object re-identification process may be performed in the server 1110, and robots in a plurality of areas may share information by means of the server 1110. A candidate group may be compressed and quickly re-identified by means of various conditions, for example, a time and/or a place suitable for a service environment.

Embodiments of the present disclosure may compress an object re-identification candidate group using an attribute, thus increasing a search speed, that is, a performance speed.

Furthermore, embodiments of the present disclosure may implement AI networks for object re-identification extraction and object attribute extraction as one AI network by means of a weight sharing method, thus maintaining the accuracy of object re-identification, increasing a performance speed, and reducing processor resource usage.

Furthermore, embodiments of the present disclosure may redefine an object re-identification dataset based on an attribute, thus increasing the accuracy of object re-identification even in a situation where an attribute is changed.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus comprising:
a processor configured to:
    generate a feature extraction module using a dataset in which an attribute for each object is defined;
    receive an image obtained by a camera;
    extract an attribute of an object of interest from the image using the learned feature extraction module;
    identify an object re-identification candidate group based on the extracted attribute of the object of interest; and
    re-identify the object of interest based on the identified object re-identification candidate group,
wherein the feature extraction module comprises:
    a base network configured to generate a feature map including an overall feature of the object of interest in the image,
    a first branch network configured to extract the attribute of the object of interest from the feature map, and
    a second branch network configured to extract an object representation of the object of interest from the feature map, and
wherein the first branch network and the second branch network are configured to filter unnecessary information from the feature map using a spatial mask.

2. The apparatus of claim 1, wherein the dataset includes an object ID and labeling information in which an attribute of an object is defined for each image.

3. The apparatus of claim 2, wherein the attribute is defined as being "complex" when the object has two or more colors, and is defined as being "unknown" when there is no portion of the object in the image or is obscured by another object.

4. The apparatus of claim 1, wherein the first branch network is generated using a binary crossentropy loss function.

5. The apparatus of claim 1, wherein the second branch network is generated using an ID classification loss function and a triplet loss function.

6. The apparatus of claim 1, wherein the processor is configured to:
    configure candidate objects registered with an object DB as a tree with respect to an object attribute;
    determine whether each node condition of the tree is met based on the attribute of the object of interest; and
    add candidate objects according to the determined result to the object re-identification candidate group.

7. The apparatus of claim 6, wherein the processor is configured to add one of a time condition, a distance condition, or a combination thereof to the tree.

8. The apparatus of claim 1, wherein the processor is configured to:
    calculate a similarity between an object representation included in the object re-identification candidate group and the object representation of the object of interest; and
    search a candidate object having the highest similarity.

9. A method comprising:
    generating, by a processor, a feature extraction module using a dataset in which an attribute for each object is defined;
    receiving, by the processor, an image obtained by a camera;
    extracting, by the processor, an attribute of an object of interest from the image using the learned feature extraction module;

identifying, by the processor, an object re-identification candidate group based on the extracted attribute of the object of interest; and re-identifying, by the processor, the object of interest based on the identified object re-identification candidate group, wherein extracting the attribute of the object of interest comprises:

generating, by the processor, a feature map including an overall feature of the object of interest in the image using a base network included in the feature extraction module, extracting, by the processor, the attribute of the object of interest from the feature map using a first branch network included in the feature extraction module, extracting, by the processor, an object representation of the object of interest from the feature map using a second branch network included in the feature extraction module, and wherein the first branch network and the second branch network filter unnecessary information from the feature map using a spatial mask.

10. The method of claim 9, wherein the dataset includes an object ID and labeling information in which an attribute of an object is defined for each image.

11. The method of claim 10, wherein the attribute is defined as being "complex" when the object has two or more colors, and is defined as being "unknown" when there is no portion of the object in the image or is obscured by another object.

12. The method of claim 9, wherein the first branch network is learned using a binary crossentropy loss function.

13. The method of claim 9, wherein the second branch network is learned using an ID classification loss function and a triplet loss function.

14. The method of claim 9, wherein identifying the object re-identification candidate group comprises:

configuring, by the processor, candidate objects registered with an object DB as a tree with respect to an object attribute;

determining, by the processor, whether each node condition of the tree is met based on the attribute of the object of interest; and adding, by the processor, candidate objects according to the determined result to the object re-identification candidate group.

15. The method of claim 9, wherein re-identifying the object of interest comprises:

calculating, by the processor, a similarity between an object representation included in the object re-identification candidate group and the object representation of the object of interest; and searching, by the processor, a candidate object having the highest similarity.

16. An apparatus comprising:

a processor configured to:

generate a feature extraction module using a dataset in which an attribute for each object is defined;

receive an image obtained by a camera;

extract an attribute of an object of interest from the image using the learned feature extraction module;

identify an object re-identification candidate group based on the extracted attribute of the object of interest; and re-identify the object of interest based on the identified object re-identification candidate group, wherein the feature extraction module comprises:

a base network configured to generate a feature map including an overall feature of the object of interest in the image, a first branch network configured to extract the attribute of the object of interest from the feature map, and a second branch network configured to extract an object representation of the object of interest from the feature map, and wherein the first branch network is generated using a binary crossentropy loss function, or wherein the second branch network is generated using an ID classification loss function and a triplet loss function.

17. The apparatus of claim 16, wherein the dataset includes an object ID and labeling information in which an attribute of an object is defined for each image.

18. The apparatus of claim 17, wherein the attribute is defined as being "complex" when the object has two or more colors, and is defined as being "unknown" when there is no portion of the object in the image or is obscured by another object.

19. The apparatus of claim 16, wherein the processor is configured to:

configure candidate objects registered with an object DB as a tree with respect to an object attribute;

determine whether each node condition of the tree is met based on the attribute of the object of interest; and add candidate objects according to the determined result to the object re-identification candidate group.

20. The apparatus of claim 16, wherein the processor is configured to:

calculate a similarity between an object representation included in the object re-identification candidate group and the object representation of the object of interest; and search a candidate object having the highest similarity.

* * * * *